(12) United States Patent
Lin

(10) Patent No.: US 9,664,151 B1
(45) Date of Patent: May 30, 2017

(54) AIR ADMISSION DEVICE FOR COMBUSTION EQUIPMENT

(71) Applicant: Kao-Shan Lin, Taipei (TW)

(72) Inventor: Kao-Shan Lin, Taipei (TW)

( * ) Notice: Subject to any disclaimer, the term of this patent is extended or adjusted under 35 U.S.C. 154(b) by 0 days.

(21) Appl. No.: 15/094,806

(22) Filed: Apr. 8, 2016

(51) Int. Cl.
    *F02M 35/10* (2006.01)
    *F02M 35/024* (2006.01)

(52) U.S. Cl.
    CPC *F02M 35/10118* (2013.01); *F02M 35/02483* (2013.01)

(58) Field of Classification Search
    CPC ....... F02M 35/10262; F02M 35/10006; F02M 35/101118; F02M 35/10327; F02M 35/10281; F02M 35/02483; F02M 29/04; F02M 57/00; F02M 69/00
    See application file for complete search history.

(56) References Cited

U.S. PATENT DOCUMENTS

| | | | | |
|---|---|---|---|---|
| 1,382,285 A * | 6/1921 | Harris | ..................... | F02M 29/04 123/556 |
| 1,503,371 A * | 7/1924 | Meyer | ..................... | F02M 1/00 123/585 |
| 2,377,088 A * | 5/1945 | Linn | ..................... | F02M 1/00 48/189.4 |
| 2,553,306 A * | 5/1951 | Dietrich | ................. | F02M 35/14 181/231 |
| 2,553,326 A * | 5/1951 | Manning | ................ | F02M 35/14 181/231 |
| 3,414,242 A * | 12/1968 | Bouteleux | ................ | F02M 1/00 123/590 |
| 3,934,569 A * | 1/1976 | Bobene | .................. | F02M 29/04 123/593 |
| 3,966,430 A * | 6/1976 | Stephens | ................ | F02M 29/06 123/590 |
| 3,982,504 A * | 9/1976 | Noguchi | ............. | F02B 19/1066 123/260 |
| 4,295,458 A * | 10/1981 | Pellerin | .................. | F02M 29/04 123/548 |
| 4,359,035 A * | 11/1982 | Johnson | ................ | F02M 29/04 123/573 |
| 4,384,563 A * | 5/1983 | Siefer | ..................... | F02M 29/04 123/549 |
| 4,492,212 A * | 1/1985 | Dooley | .................. | F02M 29/04 123/184.39 |

(Continued)

*Primary Examiner* — Hieu T Vo
*Assistant Examiner* — Sherman Manley
(74) *Attorney, Agent, or Firm* — Ming Chow; Sinorica, LLC

(57) ABSTRACT

An air admission device for combustion equipment includes a hollow tubular housing having two ends respectively provided with an air intake and an air outlet. The housing has its interior provided with a plurality of partition boards spaced apart and respectively bored with at least one air hole, the air holes of adjacent partition boards being staggered in arrangement. The air admission device is connected to combustion equipment. When operated, the combustion equipment will produce negative pressure to guide outside air to get into the housing to dash against the partition boards to increase collision probability between gas molecules for enhancing kinetic energy of gas molecules via collision and friction, thus attaining combustion-supporting effect, making combustion more complete and lowering waste gas emission.

5 Claims, 3 Drawing Sheets

(56) References Cited

U.S. PATENT DOCUMENTS

| | | | | |
|---|---|---|---|---|
| 4,667,648 A * | 5/1987 | Beldin | F02M 29/04 123/593 |
| 5,027,754 A * | 7/1991 | Morone | F01L 3/205 123/184.54 |
| 5,758,614 A * | 6/1998 | Choi | F02D 9/104 123/184.53 |
| 5,915,354 A * | 6/1999 | Ma | F02B 31/04 123/306 |
| 5,924,398 A * | 7/1999 | Choi | F02D 9/104 123/184.21 |
| 6,076,499 A * | 6/2000 | Klumpp | F02D 9/101 123/306 |
| 6,113,078 A * | 9/2000 | Rock | A61M 11/06 261/21 |
| 6,257,212 B1 * | 7/2001 | Hammond | F02M 29/02 123/557 |
| 6,314,949 B1 * | 11/2001 | DeGrazia, Jr. | F02B 29/0437 123/542 |
| 7,131,514 B2 * | 11/2006 | Choi | F01N 1/083 123/184.21 |
| 7,322,333 B2 * | 1/2008 | Isaji | F02B 31/06 123/184.51 |
| 7,458,344 B2 * | 12/2008 | Holtorf | F02B 25/24 123/65 V |
| 8,051,846 B2 * | 11/2011 | Sugishita | F02M 29/14 123/184.22 |
| 8,166,775 B2 * | 5/2012 | Choi | B60H 1/00564 181/224 |
| 2001/0050075 A1 * | 12/2001 | Lerner | F02M 35/10078 123/593 |
| 2004/0065296 A1 * | 4/2004 | Arimatsu | F02B 31/04 123/308 |
| 2004/0089271 A1 * | 5/2004 | Nagano | F02B 31/04 123/470 |
| 2005/0081821 A1 * | 4/2005 | Katou | F02B 31/08 123/308 |
| 2006/0219202 A1 * | 10/2006 | Abe | F02B 31/06 123/184.56 |
| 2006/0231067 A1 * | 10/2006 | Masuta | B22C 9/10 123/308 |
| 2007/0044780 A1 * | 3/2007 | Yamamoto | F01L 3/205 123/593 |
| 2008/0283014 A1 * | 11/2008 | Konzelmann | F02D 41/187 123/184.21 |
| 2008/0289305 A1 * | 11/2008 | Girondi | B01D 46/0012 55/385.3 |
| 2009/0272356 A1 * | 11/2009 | Abe | F02B 31/06 123/184.56 |
| 2010/0147242 A1 * | 6/2010 | Yang | F02M 29/04 123/184.21 |

* cited by examiner

AIR ADMISSION DEVICE FOR COMBUSTION EQUIPMENT

BACKGROUND OF THE INVENTION

1. Field of the Invention

This invention relates to combustion equipment, particularly to an air admission device for the combustion equipment.

2. Description of the Prior Art

Along with the development of technology and the advance of living standards, combustion equipment has become a tool for producing power in modern technology, but fuel oil that supplies combustion equipment with dynamic force comes from petroleum, which is not inexhaustible and which will become deficient and exhausted someday and further, burning of fuel oil will produce waste gas and cause air pollution. The fact is that the concept of environmental protection is gradually popularized and the energy resources on the earth increasingly becomes scarce; nevertheless, at present fuel oil still is a main fuel for combustion equipment to produce power, and petroleum is not formed in a day; therefore, the most direct method of prolonging the service life of petroleum and reducing air pollution caused by using fuel oil is to enhance combustion efficiency.

A conventional natural air induction combustion equipment includes a combustion chamber connected with an intake pipe for guiding outside air to get into the combustion chamber to have the air mixed with the fuel oil for producing explosive combustion and generating power; nevertheless, the explosive combustion by having the air mixed with the fuel oil in the combustion chamber is frequently incomplete and as a result, combustion efficiency is poor and much waste gas will be produced. In view of above-mentioned drawback, the inventor of this invention thinks that the air admission device of the conventional combustion equipment is necessary to be ameliorated and thereupon devises this invention.

SUMMARY OF THE INVENTION

The objective of this invention is to offer an air admission device for combustion equipment. Outside air can be guided to get into the air admission device by negative pressure of the combustion equipment, and kinetic energy of gas molecules can be increased via collision and friction of air, thus attaining combustion-supporting effect, making combustion more complete and lowering waste gas emission.

The air admission device for combustion equipment in the present invention includes a hollow tubular housing and a plurality of partition boards. The housing has two ends respectively and axially provided with an air intake and an air outlet. The partition boards are spaced apart, formed with an air chamber between every two partition boards, and axially and vertically positioned in the housing. Further, the partition boards are respectively bored with at least one air hole, and the air holes of adjacent partition boards are staggered in arrangement, letting the air chambers and the air holes communicate with one another to form an air guide passage.

The air admission device for combustion equipment in the present invention has the air outlet connected with an air tap, which is connected with an intake manifold, and the air admission device is connected to the return air inlet of the combustion equipment via the intake manifold. When the combustion equipment is operated, the air admission device will produce negative pressure to guide outside air to get into the housing through the air intake and passing through the filter material. When flowing through the air guide passage, the air will dash against the partition boards to increase collision probability between gas molecules, and the kinetic energy of the gas molecules will be enhanced through collision and friction of the gas molecules in the air, thus able to achieve combustion-supporting effect, make combustion more complete and lower waste gas emission.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
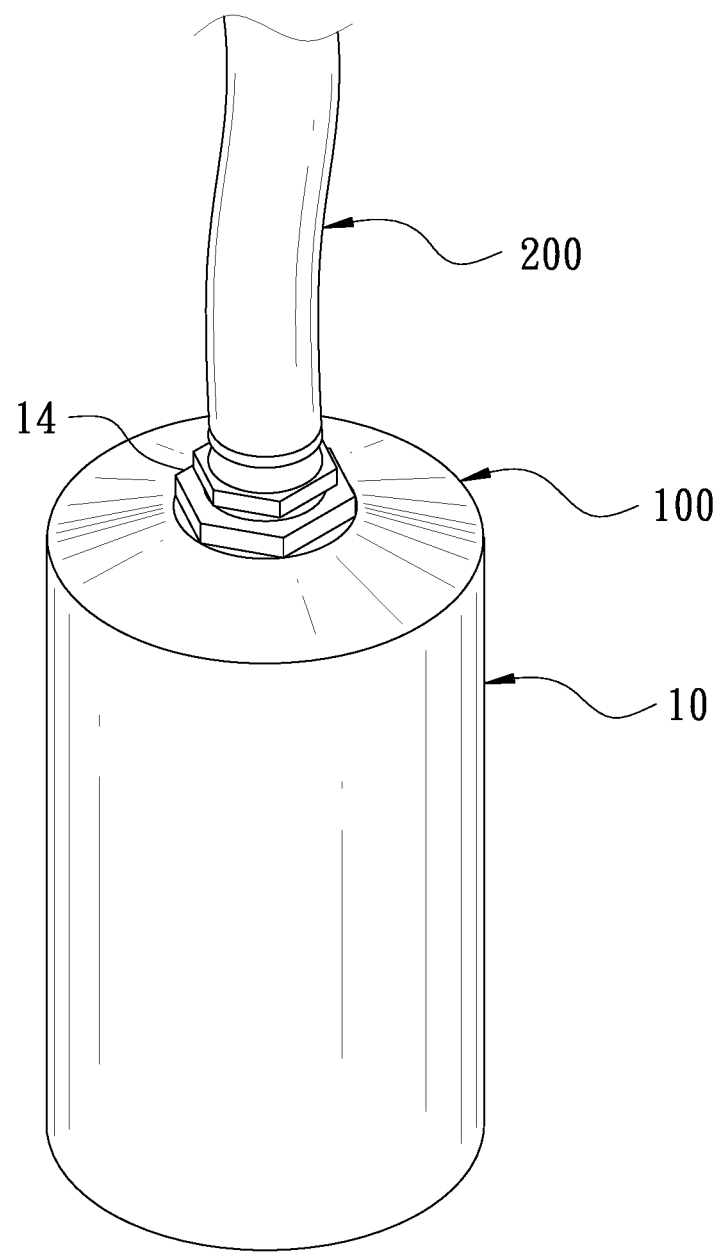
FIG. 1 is a perspective view of an air admission device for combustion equipment in the present invention.
Figure 2:
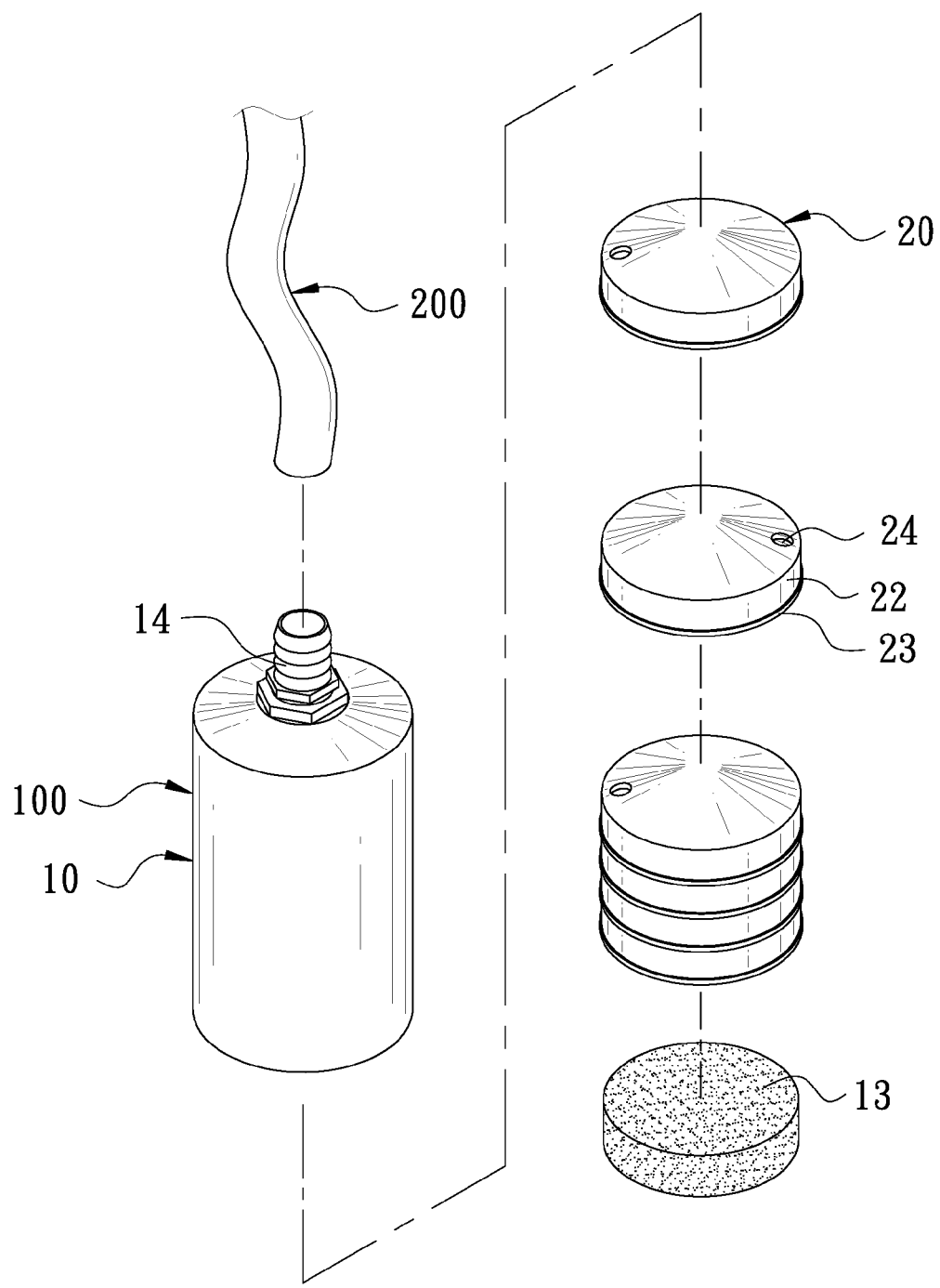
FIG. 2 is an exploded perspective view of the air admission device for combustion equipment in the present invention.

A preferred embodiment of an air admission device 100 for combustion equipment in the present invention, as shown in FIGS. 1 and 2, includes a housing 10 and a plurality of partition boards 20 as main components combined together.

The housing 10 with a hollow tubular shape has two ends respectively and axially formed with an air intake and an air outlet 12 and is provided with a filter material 13 at the location corresponding to the air intake 11 and an air tap 14 connected with the air outlet 12.

The partition boards 20 are respectively formed into a conical shape slanting outward and downward from the center. The partition boards 20 are spaced apart, having an air chamber 21 formed between every two partition boards 20 and axially and vertically positioned in the interior of the housing. Further, the partition boards 20 have their outer circumferential edges respectively and annularly provided with a projecting ring 22 stretching downward and having a lower end annularly provided with a projecting edge 23, which extends outward and has its outer circumferential edge resisting against the inner wall of the housing 10. Furthermore, the partition boards 20 are respectively board with at least one air hole 24, and the air holes 24 of adjacent partition boards 20 are staggered in arrangement, letting the air chambers 21 and the air holes 24 communicate with one another to form an air guide passage.

Figure 3:
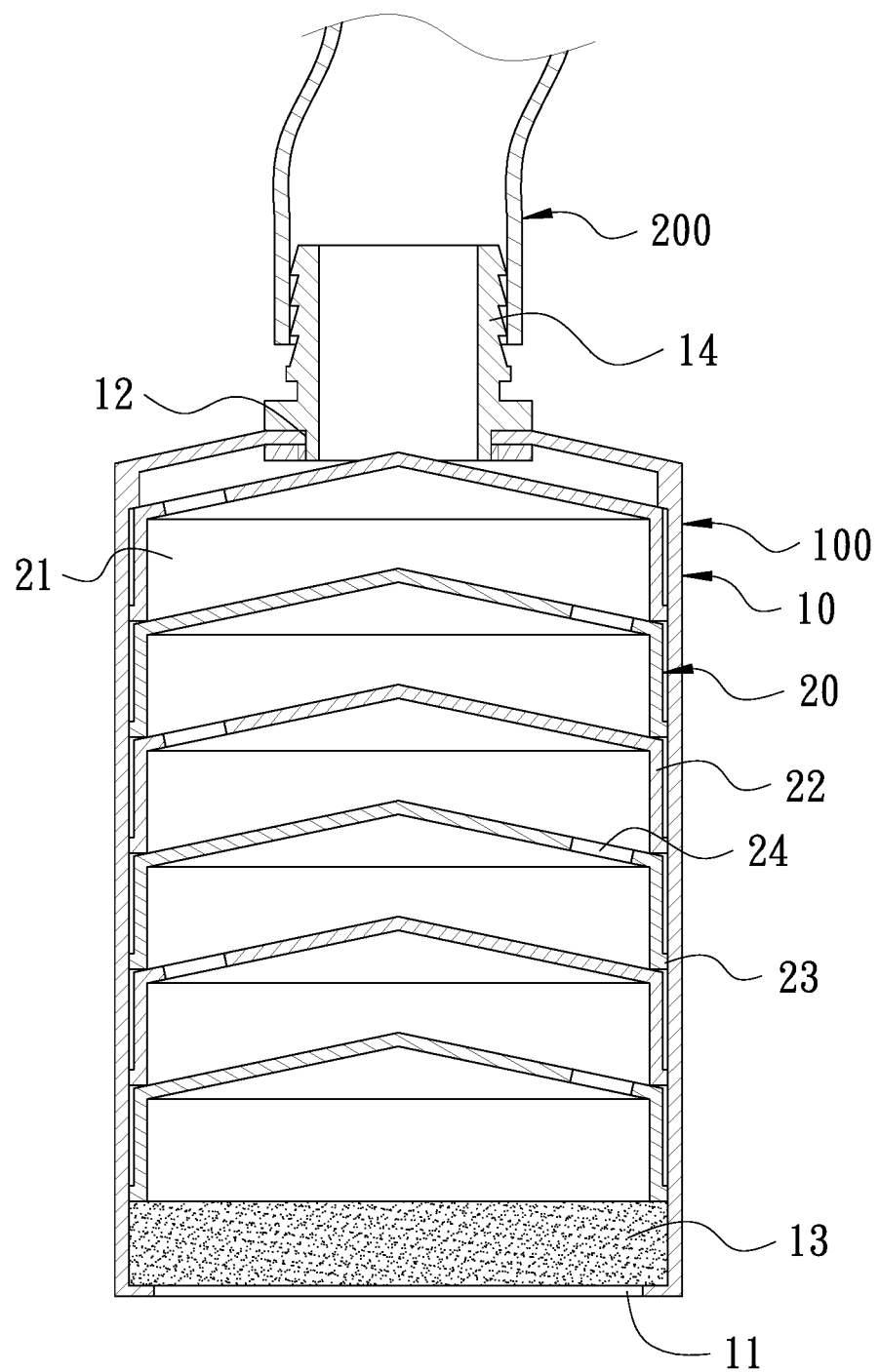
FIG. 3 is a schematic view of the air admission device for combustion equipment in the present invention; showing the flowing direction of air.

In using, referring to FIG. 3, the air admission device 100 has the air tap 14 connected with an intake manifold 200, which is connected to a return air inlet of the combustion equipment. When the combustion equipment is operated, the interior of the housing 10 will produce negative pressure to guide outside air to pass through the air intake 11 and the filter material and get into the housing 10 and simultaneously, the filter material 13 will function to stop foreign matters and suspended particles from getting into the housing 10.

Since adjacent partition boards 20 are stacked on one another by means of the projecting rings 22, letting the partition boards 20 form a multilayer structure; therefore, when air circulates and dashes against the partition boards 20, the partition boards 20 will not sway in the housing 10 because the partition boards 20 are closely fixed in place by having the outer circumferential edges of the projecting edges 23 of the partition boards 20 firmly resisting against the inner wall of housing 10.

The partition boards 20 are spaced apart and firmly positioned in the housing 10 and has the air chambers 21 respectively formed between every two partition boards 20 and the air chambers 21 communicate with the air holes 24 to make up an air guide passage. In addition, the partition boards 20 are respectively cone-shaped slanting outward and downward from the center, letting the air guide passage formed into a circuitous shape. By so designing, when outside air is guided to get into the air admission device 100 via the negative pressure of the combustion equipment and pass through the air guide passage, the frequency that the gas molecules in the air collide with the partition boards 20 will be greatly increased and thus, by collision and friction, the gas molecules in the air will enhance their kinetic energy for attaining combustion-supporting effect, able to make combustion more complete and hence lower waste gas emission.

While the preferred embodiment of the invention has been described above, it will be recognized and understood that various modifications may be made therein and the appended claims are intended to cover all such modifications that may fall within the spirit and scope of the invention.

What is claimed is:

1. An air admission device for combustion equipment comprising:
   a housing, said housing being a hollow tubular shape, said housing having two ends respectively and axially provided with an air intake and an air outlet; and
   a plurality of partition boards, said partition boards spaced apart and having an air chamber formed between every two said partition boards, said partition boards axially and vertically disposed in said housing, said air holes of adjacent said partition boards being staggered in arrangement to enable said air chambers and said air holes to communicate with one another to form an air guide passage;
   Said air outlet of said housing able to be connected to a return air inlet of combustion equipment by means of an intake manifold, said air admission device producing negative pressure to guide outside air to get into said air guide passage through said air intake when said combustion equipment is operated, the air circulating in said air guide passage and dashing against said partition boards, able to increase collision probability between gas molecules, kinetic energy of gas molecules increasing via collision and friction of the gas molecules in the air, thus able to attain combustion-supporting effect, make combustion more complete and lower waste gas emission.

2. The air admission device for combustion equipment as claimed in claim 1, wherein a filter material is provided at a location corresponding with said air intake of said housing.

3. The air admission device for combustion equipment as claimed in claim 1, wherein said air outlet is connected with an air tap.

4. The air admission device for combustion equipment as claimed in claim 1, wherein said partition boards are respectively cone-shaped, slanting outward and downward from a center.

5. The air admission device for combustion equipment as claimed in claim 1, wherein said partition boards have their outer circumferential edges respectively and annularly provided with a projecting ring stretching downward, said projecting rings having their lower ends respectively and annularly provided with a projecting edge extending outward, said projecting edges having their outer circumferential edges resisting against an inner wall of said housing.

* * * * *